(12) United States Patent
Biehl et al.

(10) Patent No.: US 11,068,854 B2
(45) Date of Patent: Jul. 20, 2021

(54) SYSTEMS AND METHODS FOR AUTOMATIC AWARENESS AND MANAGEMENT OF CORPORATE VISITOR SCHEDULING AND COORDINATION

(71) Applicant: FUJIFILM Business Innovation Corp., Tokyo (JP)

(72) Inventors: Jacob Biehl, San Jose, CA (US); Gerald Filby, San Francisco, CA (US); Krishna Chaitanya Pavuluri, Union City, CA (US)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 421 days.

(21) Appl. No.: 15/348,994

(22) Filed: Nov. 11, 2016

(65) Prior Publication Data
US 2018/0137469 A1    May 17, 2018

(51) Int. Cl.
| | | |
|---|---|---|
| *G06Q 10/10* | (2012.01) | |
| *H04W 4/02* | (2018.01) | |
| *H04W 4/33* | (2018.01) | |
| *H04W 4/029* | (2018.01) | |
| *H04W 4/80* | (2018.01) | |

(52) U.S. Cl.
CPC ........ *G06Q 10/1095* (2013.01); *H04W 4/023* (2013.01); *H04W 4/029* (2018.02); *H04W 4/33* (2018.02); *H04W 4/80* (2018.02)

(58) Field of Classification Search
None
See application file for complete search history.

(56) References Cited

U.S. PATENT DOCUMENTS

| | | | | |
|---|---|---|---|---|
| 7,869,941 | B2* | 1/2011 | Coughlin | G01C 21/20 701/533 |
| 7,966,369 | B1* | 6/2011 | Briere | G06Q 10/10 709/204 |
| 8,112,299 | B2* | 2/2012 | Kim | G01C 21/362 705/7.18 |
| 2007/0118415 | A1* | 5/2007 | Chen | G06Q 10/02 705/5 |
| 2009/0199192 | A1* | 8/2009 | Laithwaite | G06Q 10/06 718/104 |
| 2011/0029420 | A1* | 2/2011 | Bianco | G06Q 10/06 705/32 |

(Continued)

OTHER PUBLICATIONS http://www.usatoday.com/story/tech/2015/01/28/delaware-aims-to-be-1st-with-digital-drivers-licenses/22449899/, The News Journal, Wilmington, DE, Jan. 25, 2015.

*Primary Examiner* — Stephanie Z Delich
(74) *Attorney, Agent, or Firm* — Procopio, Cory, Hargreaves & Savitch LLP (57) ABSTRACT

A system and method for automating scheduling and coordination activities associated with the organizational responsibilities of hosting visitors (whether from the same company or an external organization). System leverages location technologies and other services to track the location of visitors, hosts, and other key participants related to the agenda items. The system performs the matching tracking information of visitor(s), participant(s), and the location of agenda event(s). The design of the described system rests on the assumption that visitors are a special type of person in an organization whose movements are actively tracked and managed through organizational policies and/or practices.

26 Claims, 9 Drawing Sheets

(56) References Cited

U.S. PATENT DOCUMENTS

| | | | |
|---|---|---|---|
| 2011/0252097 A1* | 10/2011 | Walker | G06Q 10/06 709/206 |
| 2013/0023279 A1* | 1/2013 | Poon | H04W 4/14 455/456.1 |
| 2013/0212494 A1* | 8/2013 | Heiferman | G06Q 10/1095 715/753 |
| 2013/0282421 A1* | 10/2013 | Graff | G06Q 10/1093 705/7.18 |
| 2015/0112745 A1* | 4/2015 | Wang | G06Q 10/063114 705/7.15 |
| 2015/0154524 A1* | 6/2015 | Borodow | H04W 4/029 705/7.23 |
| 2016/0165056 A1* | 6/2016 | Bargetzi | G06Q 10/1095 455/416 |

* cited by examiner

SYSTEMS AND METHODS FOR AUTOMATIC AWARENESS AND MANAGEMENT OF CORPORATE VISITOR SCHEDULING AND COORDINATION

BACKGROUND OF THE INVENTION

Technical Field

The disclosed embodiments relate in general to geo-location and tracking systems and methods and, more specifically, to systems and methods for automatic awareness and management of corporate visitor scheduling and coordination.

Description of the Related Art

Planning, coordinating, communicating, escorting, and reporting outside visitors in modern organizations is an incredibly manual, burdensome and high-cost activity. In many organizations, dedicated personnel are employed to perform many of these tedious functions. In other organizations, host employees are burdened with providing meeting logistics. In both situations, the organization is spending human resources that are not directly applied to achieving the organization's core function.

Therefore, as would be appreciated by those of skill in the art, new and improved systems and methods for automatic awareness and management of corporate visitor scheduling and coordination would be highly desirable as such technology would eliminate many of the manual functions associated with outside visitor management and, therefore, would result in substantial savings of valuable employee time and other resources.

SUMMARY OF THE INVENTION

The embodiments described herein are directed to methods and systems that substantially obviate one or more of the above and other problems associated with conventional corporate visitor management techniques.

In accordance with one aspect of the inventive concepts described herein, there is provided a computer-implemented method, the method being performed in a computerized system incorporating a central processing unit, a localization signal receiver and a memory, the computer-implemented method involving: receiving at least one localization signal using the localization signal receiver; determining a location of a person based on the received at least one localization signal; storing information on a role of the person in connection with an visit; storing information on an agenda of the visit; and using the determined location of the person, the stored role information and the stored visit agenda information to manage the visit.

In one or more embodiments, the visit agenda information comprises information on each event associated with the visit.

In one or more embodiments, the stored information on an agenda of the visit comprises a location of the event and wherein managing the visit comprises generating a graphical user interface comprising a location indicator indicating the location of the person in relation to the location of the event.

In one or more embodiments, when the localization signal is not received, the location indicator indicates that the location of the person cannot be determined.

In one or more embodiments, the location indicator is selected from a group comprising: "in the building," "near the building," "far from the building."

In one or more embodiments, the location indicator is selected from a group comprising: "in the building," "near the building," "far from the building" and "in the location of the event."

In one or more embodiments, the location indicator comprises a colored graphics widget and wherein the color of the graphics widget is indicative of the location of the person in relation to the location of the visit.

In one or more embodiments, the location indicator comprises a measure of a distance between the location of the person and the location of the visit.

In one or more embodiments, the measure of the distance is indicated in distance units.

In one or more embodiments, the measure of the distance is indicated in time units indicative when the person would arrive to the location of the visit.

In one or more embodiments, the visit agenda information comprises a time of the event and wherein managing the visit comprises generating a graphical user interface comprising an indicator indicating whether the person is delayed for the event.

In one or more embodiments, the indicator comprises a measure of time of the delay of the person for the visit.

In one or more embodiments, the visit agenda information comprises information on each person participating in each event associated with the visit.

In one or more embodiments, the information on each person participating in the visit comprises person's mobile device identifier (ID).

In one or more embodiments, the role of the person in connection with the visit is selected from a group consisting of a visitor person, a host person and a non-host participant person and wherein each visit is associated with at least one visitor person and at least one host person.

In one or more embodiments, the method further involves notifying the host person of an arrival of the visitor person in a location associated with the visit.

In one or more embodiments, the method further involves notifying the host person of an attention request from the visitor person.

In one or more embodiments, the method further involves notifying the host person of a delay in arrival of the visitor person in a location associated with the visit.

In one or more embodiments, information on each event associated with the visit comprises a time and a location of each event associated with the visit and wherein the computer-implemented method further involves automatically adjusting the time of each event associated with the visit based on location of the person in relation to the location of the event.

In one or more embodiments, the method further involves providing the adjusted time of each event associated with the visit to each person associated with the event.

In one or more embodiments, the localization signal comprises one or more Bluetooth Low Energy (BLE) signals from one or more BLE beacons.

In one or more embodiments, the role of the person in connection with the visit is an administrative person and wherein the computer-implemented method further comprises notifying the administrative person of an arrival of the visitor person in a location associated with the visit or of a delay in arrival of the visitor person in a location associated with the visit.

In accordance with another aspect of the inventive concepts described herein, there is provided a non-transitory computer-readable medium embodying a set of computer-executable instructions, which, when executed in connection with a computerized system incorporating a central processing unit, a localization signal receiver, a display and a memory, cause the computerized system to perform a method involving: receiving at least one localization signal using the localization signal receiver; determining a location of a person based on the received at least one localization signal; storing information on a role of the person in connection with an visit; storing information on an agenda of the visit; and using the determined location of the person, the stored role information and the stored visit agenda information to manage the visit.

In accordance with yet another aspect of the inventive concepts described herein, there is provided a computerized system incorporating a central processing unit, a localization signal receiver and a memory, the memory storing a set of computer-readable instructions causing the computerized system to perform a method involving: receiving at least one localization signal using the localization signal receiver; determining a location of a person based on the received at least one localization signal; storing information on a role of the person in connection with an visit; storing information on an agenda of the visit; and using the determined location of the person, the stored role information and the stored visit agenda information to manage the visit.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

One or more of the embodiments described herein provide a set of tools, systems, and processes associated with automating the processes surrounding visitor management. One or more of the described embodiments provide novel features usable in connection with a visitor management tool that can be enabled through the combination of tracking visitors (using their personal devices as a surrogate), the agenda related to when and where visit-related events are to occur, and a set of mobile interfaces for notifying and interacting with visitors.

Figure 1:
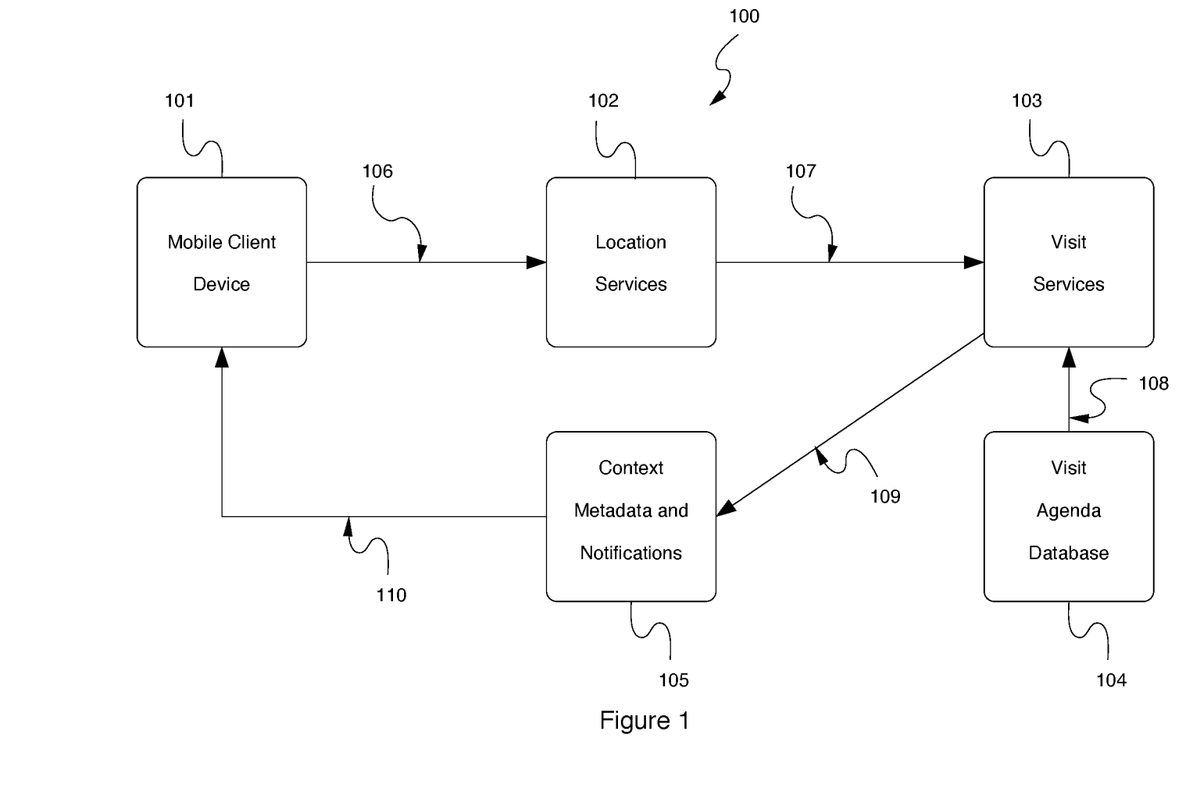
FIG. 1 illustrates an exemplary embodiment of a system for automatic awareness and management of corporate visitor scheduling and coordination.

FIG. 1 illustrates an exemplary embodiment of a system 100 for automatic awareness and management of corporate visitor scheduling and coordination. The embodiment shown in FIG. 1 incorporates several functional components. In one embodiment, the system 100 incorporates one or more mobile client device(s) 101, location services 102, visit services 103, a visit agenda database 104 as well as a context metadata and notifications 105. The purpose, overall operation and novel functionality of these components will be described in detail below.

In one or more embodiments, the aforesaid visit agenda database 104 contains all the information that must be known in order to support the novel features of the embodiments described herein. This information includes, for example, the names, contact information, and device information (device identifier (ID) needed to associate a user with his/her device) of all people involved in the visit. These people can be of three different types (also referred herein as roles): a visitor (a person coming to visit), a host (a person responsible for managing the visitor(s)), and a participant (a person part of the organization that is participating in visit activities, but is not the host).

In one or more embodiments, the visit agenda database 104 also captures information about one or more visit events, including the day(s), time(s), and location(s) (e.g. the building or campus where the visit will occur). Additionally, events within the visit may be also captured. The aforesaid events within the visit are referred to herein as "gatherings," and are typically the individual appointments or meetings that are scheduled during the visit. In one or more embodiments, the aforesaid visit agenda database 104 additionally stores the association between people and agenda items (e.g. Visit A, has Host B, Visitors C and D, and Gatherings E and F). In various embodiments, the visit agenda database 104 may be implemented based on any now known or later developed type of database software, such as a relational database management system, including, without limitation, MySQL, Oracle, SQL Server, DB2, SQL Anywhere, PostgreSQL, SQLite, Firebird and/or MaxDB, which are well-known to persons of skill in the art. In an alternative embodiment, a cloud-based distributed database, such as Amazon Relational Database Service (Amazon RDS), well known to persons of ordinary skill in the art, may also be used to implement the visit agenda database 104.

In one or more embodiments, location services 102 are responsible for all the operations related to tracking of the mobile client device(s) 101. In one embodiment, the location services 102 contain three main elements—a constellation of BLE beacons deployed in the locations where location tracking is to be performed, a client runtime library that is embedded in the deployed mobile application executing on the mobile client device 101 that scans and, in some cases, computes an estimation of the devices location, and the location services 102 that receives the location estimations and/or scan data 106 in FIG. 1, maintains a history of these location estimations, and provides an API for other services to access this information. The location services 102 also maintain taxonomy for describing locations; this includes the buildings, floors, spaces, and points of interest. As would be appreciated by persons of ordinary skill in the art, the described embodiments are not limited to any specific location determination technique and other such techniques, such as GPS or WIFI could be used for determining the current location(s) of the mobile client device(s) 101.

In one or more embodiments, the mobile client device(s) 101 each execute a client application, which contains the location tracking runtime and provides an interface for the system to interact with visitors, hosts, and participants.

In one or more embodiments, the visit services 103 may be deployed on a server where all the logic components and events are triggered. The visit services 103 communicate with the client applications on all users' mobile client devices 101, the location services 102 (for managing the relationship between locations as they relate to agenda items and the estimates of location determined by the location services), and various other third-party internet-based services that may need to be leveraged for additional information or action. The system 100 may further include one or more administrator client device 106 for displaying the current (e.g. real-time) status or locations of the visitors and other users and for providing historical audit information. In various embodiments, the administrator client device 106 may be a mobile device, such as a smartphone or a tablet or a stationary device such as desktop computer. In another embodiments, the status or locations of the visitors may be displayed on display devices of the mobile client devices 101 of the visit host users.

In one or more embodiments, the system for automatic awareness and management of corporate visitor scheduling and coordination 100 shown in FIG. 1 generates a graphical user interface on a display device, which provides a real-time visit/gathering and people status information. In various embodiments, the aforesaid display device may be connected to the administrator client device 106 of the system 100. In one embodiment, the aforesaid system 100 provides a dashboard-like real-time summary of all the visitors, hosts, and participants and their relationship to the current or upcoming visit and/or gathering. Specifically, in one exemplary embodiment, the generated graphical user interface provides at-a-glance real-time context about each persons' location relative to the location of the corresponding event.

Figure 2A:
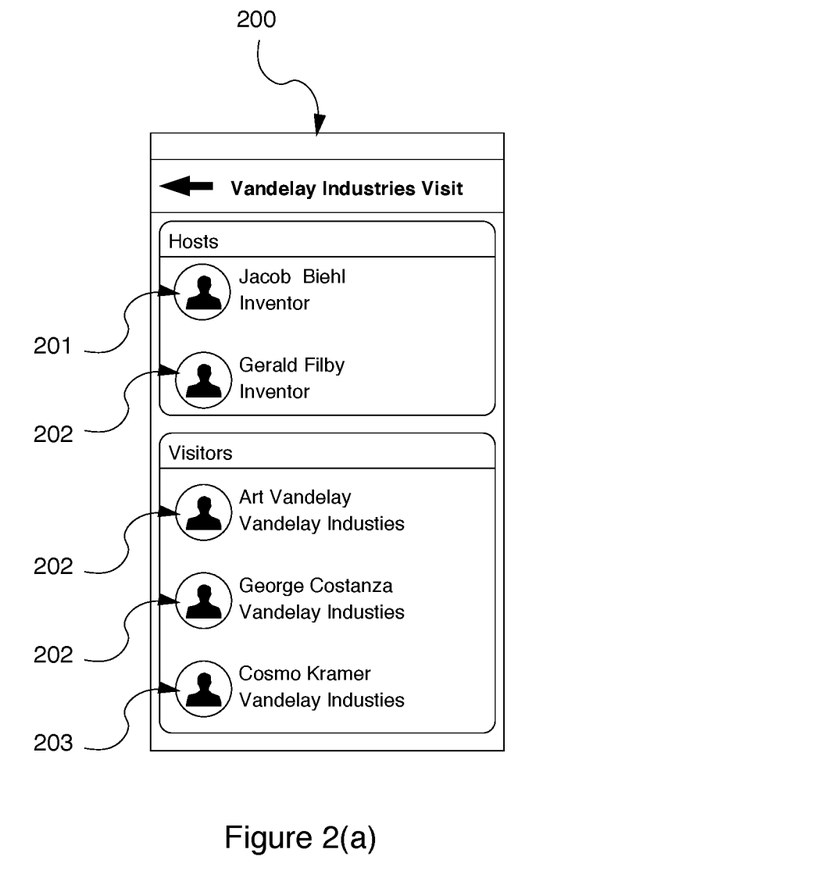
FIGS. 2(a), 2(b), 2(c) and 2(d) illustrate various exemplary graphical user interfaces generated by an embodiment of the system for automatic awareness and management of corporate visitor scheduling and coordination shown in FIG. 1.

An exemplary embodiment of the aforesaid graphical user interface 200 is illustrated in FIG. 2(a). In one or more embodiments, each visit is associated with a building-level location descriptor representing the location of the meeting or other appropriate activity associated with the visit. In one or more exemplary embodiments, the aforesaid location descriptor for each visit is stored in an appropriate location descriptor record in the visit agenda database 104. For instance, for a visitor to a corporate headquarters, the visit would be anchored to "Main Building," which would be the content of the location descriptor record. In one or more embodiments, the aforesaid graphical user interface indicates to the user(s) the location of each person associated with the visit in relation to the aforesaid visit activity location as stored in the building-level visit location descriptor record.

As shown in FIG. 2(a), in one or more embodiments, based on the current location of a person determined by the location services 102, the person is represented by the aforesaid graphical user interface using one of the following four states describing person's current location in relation to the aforesaid visit location descriptor. In a first exemplary state, the person is located in the building of the visit activity. This state is depicted with a green halo 201 around the person's picture in the current embodiment. In a second exemplary state, the person is located near (proximate) the building of the visit activity. The proximity may be defined as either a predetermined distance (e.g. a number of feet or meters) of the person from the activity building, or a predetermined time (e.g. a number of minutes) of travel time from the person's current location to the activity building. This state of proximity is depicted with an orange halo 202 in FIG. 2(a).

In a third exemplary state, the person is located far from the visit activity building. In this situation, the person's location may exceed the limits set by the above-described in and near conditions (the first and second states). This state is depicted with a red halo 203 in FIG. 2(a). Finally, in the fourth exemplary state, there is no information on the person's current location. Thus, the system cannot determine and/or estimate this person's location relative to the visit activity location.

Figure 2B:
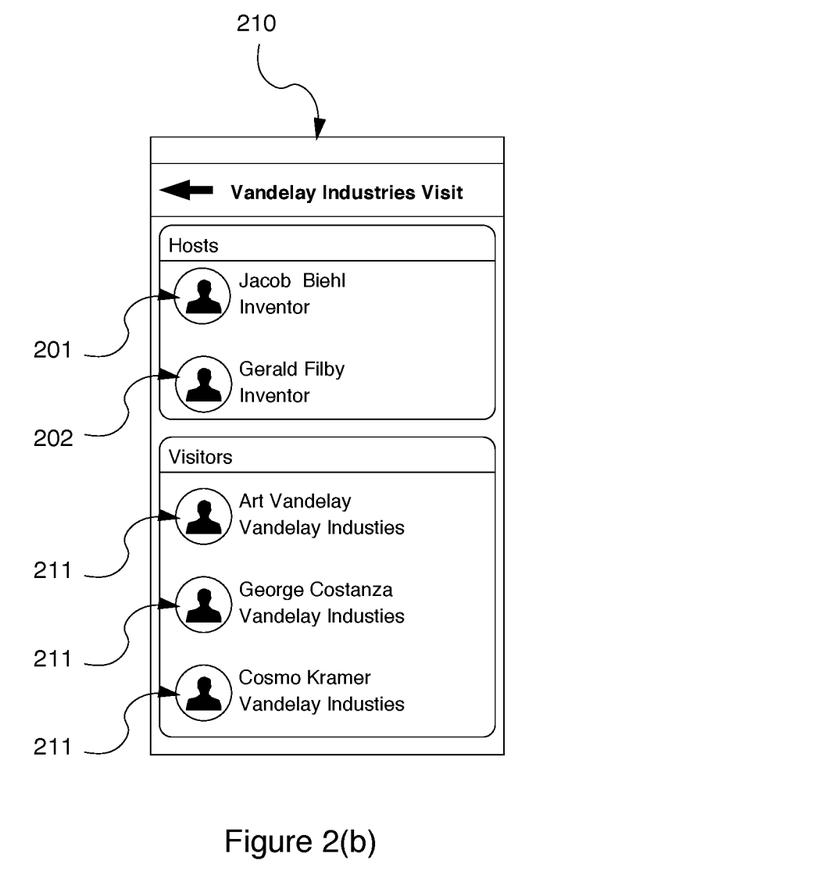

In one exemplary situation, Art, George and Cosmo are visitors and they are on the way to the building of the visit activity. When they are far from the visit activity building, this state is depicted with a red halo 211 around the respective pictures of Art, George and Cosmo in the user interface screen 210 shown in FIG. 2(b).

Figure 2C:
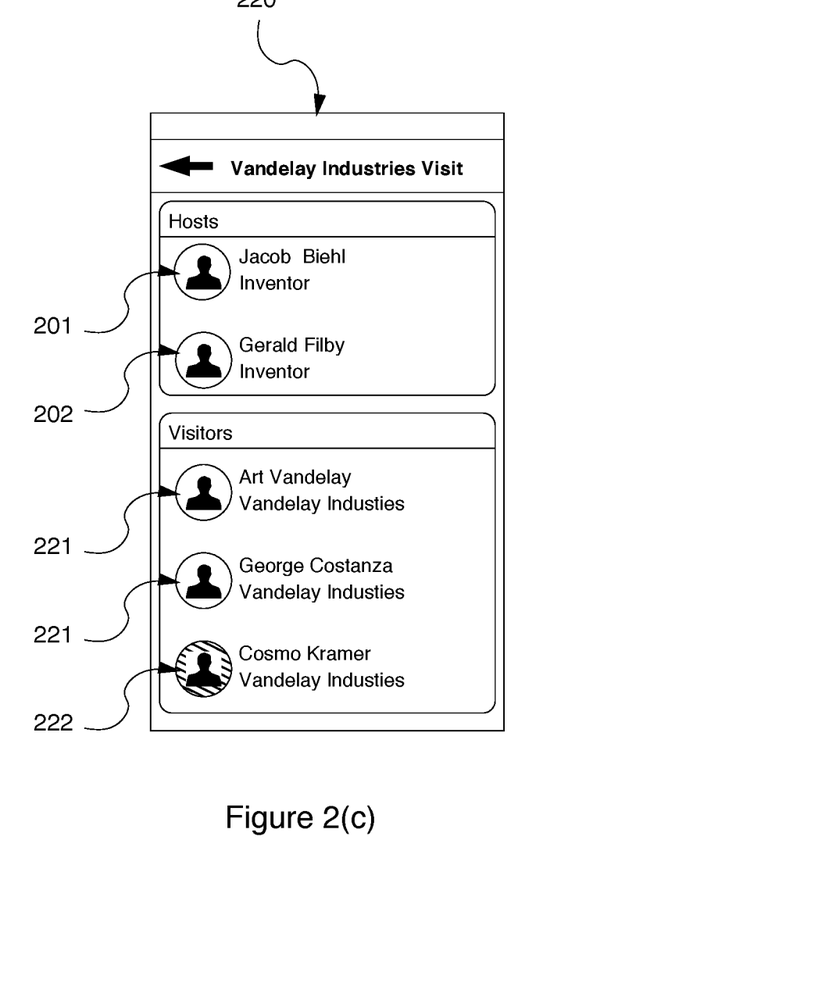

Thereafter, Art and George arrive at the vicinity the visit activity building and the color of the halo 221 around Art and George's respective pictures changes to orange, see user interface screen 220 shown in FIG. 2(c). If there is no information on the Cosmo's current location, Cosmo's picture (inside the halo 222) in the user interface screen 220 is shaded. The shaded picture indicates that the location of the person whose picture is so shaded cannot be determined. In this situation, the color of the halo 222 around the shaded picture may be changed to the specified color that indicates the absence of information in the person's location. For example, the color of the aforesaid halo 222 may change to gray. In other words, the gray colored halo 222 and the shade in FIG. 2(c) indicate that the system cannot determine the person's current location.

Figure 2D:
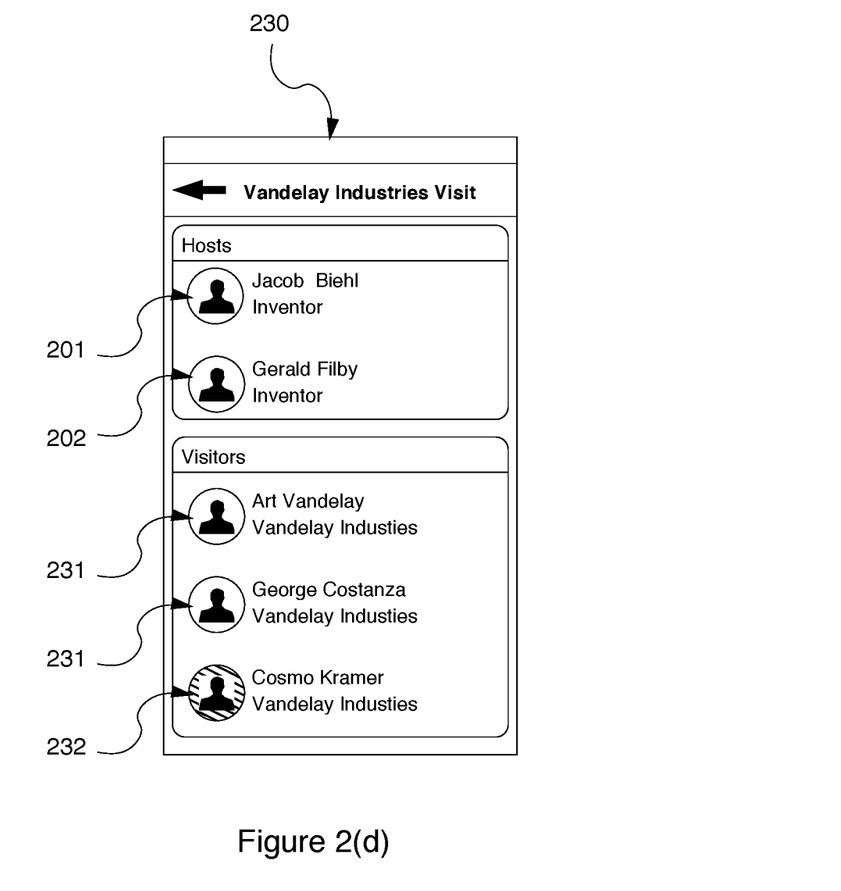

In yet another embodiment illustrated in FIG. 2(d), there is still no information on the Cosmo's current location, but Cosmo's last determined location was far from the visit activity building and the halo color around Cosmo's picture was red, see halo 203 in FIG. 2(a). In this embodiment, if there is no information on the Cosmo's current location, Cosmo's picture (inside the halo 232) is shaded on, but the color of halo 232 may be kept as red. In other words, the shaded picture means that the system cannot determine the current location of the person indicated shaded picture, and the halo's color means the person's previous location. The color of the halo 231 around Art and George's respective pictures in the user interface screen 230 in FIG. 2(d) changes to green indicating that they have arrived at the visit activity building.

In one or more embodiments, a detailed description of the location context may be additionally provided in the user detail view. This detailed view is where the estimates of distance and/or time from the person's current location to the activity location may be seen for each user. The detailed view may also indicate additional information, such as the person's current location, speed, accessibility and the like.

In one or more embodiments, for gatherings, an additional fifth exemplary state is provided, wherein the person is located in the gathering space. This state is depicted with a blue halo around the person's picture (not shown in FIGS. 2(a)-2(d)). This exemplary state indicates that the person is in the space assigned for the currently scheduled gathering (e.g. Person X is in Conference Room Y). As would be appreciated by persons of ordinary skill in the art, the above colors associated with the described states are exemplary only and any other suitable color combinations may be used to indicated the person's current state. In addition, the invention is not limited to the described five states and many other appropriate states may be used in connection with the system 100 for automatic awareness and management of corporate visitor scheduling and coordination shown in FIG. 1.

In one or more embodiments, the described system 100 provides role, location and agenda actions and notifications for the visits and associated persons. Specifically, in one embodiment, the system 100 may provide location-based notifications to people based on the combination of role, location, and agenda details. Specifically, in one embodiment, the system 100 is configured to provide the following awareness notifications.

Figure 3:
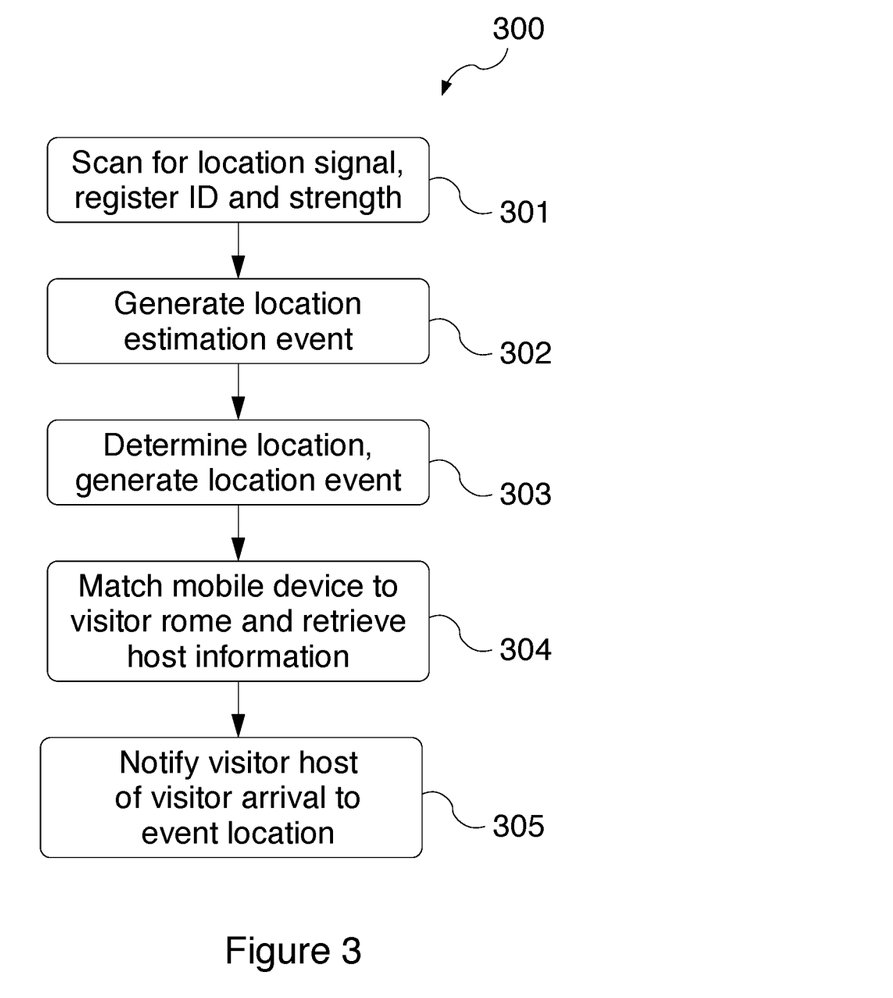
FIG. 3 illustrates an exemplary operating sequence of the system for automatic awareness and management of corporate visitor scheduling and coordination shown in FIG. 1.

In one or more embodiments, the system 100 may generate an appropriate notification to alert host(s) when visitor(s) are near and/or have arrived at the visit location. An exemplary operating sequence 300 of such an embodiment is shown in FIG. 3. First, at step 301, a mobile client application executing on the users' mobile client devices 101 periodically scans the ambience for BLE beacons or other electromagnetic signal sources and registers beacon IDs as well as corresponding signal strengths. At step 302, the aforesaid mobile client application generates a location estimation event by sending the received BLE beacon IDs and, optionally, corresponding signal strength to the location services 102, together with its own ID or the ID of the corresponding mobile client device 101 on which it is executing, see element 106 in FIG. 1. This triggers the determination by the location services 102 of the location of the mobile client devices 101 in a manner well known in the art, and generation of a location event 107, whereby the aforesaid determined location information is sent it to the visit services 103 by the location services 102, see step 303. Upon the receipt of the aforesaid location event, at step 304, the visit services 103 matches the mobile client device 101 associated with that event (using the mobile client device ID sent in step 302) to a visitor role in a current visit record of the visit agenda database 104 and uses that visit record to retrieve information (e.g. IDs) on the associated host entities (visitor hosts), see element 108 in FIG. 1. The visit services 103 subsequently notifies the determined visitor hosts when the visitor(s) are near and/or have arrived at the visit location as determined by the location services 102, see step 305 and elements 109 and 110 in FIG. 1. It should be noted that the aforesaid notification may be sent to the visitor hosts using a variety of now known or later developed means including, without limitation, email, text (SMS), call, a popup message on the screen of the corresponding mobile client device 101, a sound emitted by or vibration of such mobile client device 101.

In one or more embodiments, the system 100 may generate an appropriate notification to alert host(s) to visitor(s) attention request. Such alert is triggered by direct interaction in the client mobile application when a visitor requests the attention of a specific host or all hosts. In such embodiment, the location of the visitor, as determined using the location services 102 in the manner described above, is sent to all hosts associated with the current visit agenda event.

In one or more embodiments, the system 100 may generate an appropriate notification indicating that any participating person is late for current agenda event. If a person with visitor role is running late for an event, in one embodiment, this will also trigger notification to the host(s) of the affected events, as may be determined using the records stored in the visit agenda database 104. The system 100 may also be configured to provide a reminder to a person that at the given time, this person is scheduled to be in a different location. In one embodiment, the system 100 may be further configured to also provide directions and/or a map assisting the person to arrive at the agenda location.

In one or more embodiments, the system 100 for automatic awareness and management of corporate visitor scheduling and coordination is configured to provide an agenda timeline tracking and management. In this embodiment, the location of the user relative to a prescribed agenda event location can be tracked to potentially determine if an agenda timeline is no longer accurate. This situation may be detected in several ways. First, if persons X, Y, Z are prescribed to attend agenda event B which is at location 2 but are still being tracked in location 1, which is associated with agenda event A, then the system 100 may determine that the agenda timeline is no longer accurate. Second, such determination may be similarly made if persons X, Y, Z are prescribed to attend agenda event B which is at location 1, but persons N, M are still in location 1, which was also associated with event A. Third, the system 100 may make the same determination if a proportion of persons associated with event A are not located in the specified location.

Figure 4:
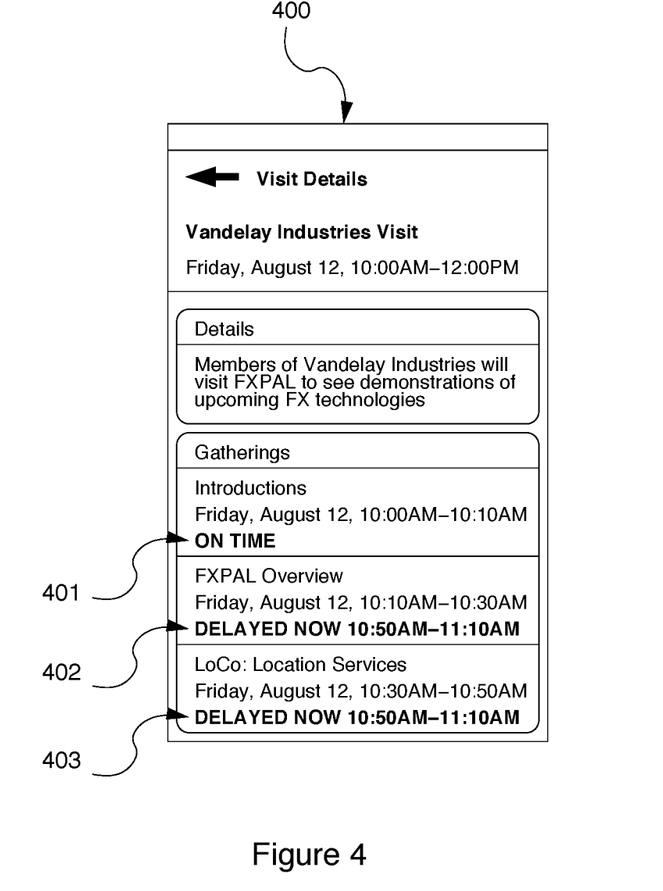
FIG. 4 illustrates another exemplary graphical user interface generated by an embodiment of the described system for automatic awareness and management of corporate visitor scheduling and coordination shown in FIG. 1.

In one or more embodiments, the system 100 for automatic awareness and management of corporate visitor scheduling and coordination is further configured to enable a manual indication of delay by agenda event host. When such delays are detected by the system 100, an estimated duration of the delay may be calculated and sent to all affected persons. In the simplest case, the duration of the delay could be the difference in times between the actual start of the event and the scheduled start. In alternative embodiments, more sophisticated models for estimating the delay could be used. For example, delay estimation models could use historical information about delays associated with specific people, a specific number of people, keywords used to describe the agenda item, the location of the agenda event, or any combination of these items. Moreover, as illustrated in FIG. 4, delay information (or the lack of the delay) 401, 402 and 403 could be reported in the agenda graphical user interface 400 to inform persons associated with downstream agenda events of the potential delay. The delay information can also be relayed to the visit host(s) and present them with an option to cascade the delay through the agenda and to notify impacted persons.

Similarly, an embodiment of the system 100 for automatic awareness and management of corporate visitor scheduling and coordination could be configured to determine when agenda events started early and/or have ended early using similar heuristics described above. Further, the system 100 could also be configured to provide manual mechanisms to cancel an agenda event and automatically restructure the remaining agenda, if desired.

In one or more embodiments, the system 100 for automatic awareness and management of corporate visitor scheduling and coordination is configured to provide security audits and notifications. Specifically, this embodiment is capable of maintaining and providing detailed logs and visual representations of where a visitor traveled during a visit. This feature is especially useful, because many visitors require escorts and/or are subject to limitations as to which locations they may enter within an organization. The aforesaid log may also report when the visitor was not in the same location as the designated event host(s), indicating potential breach in an organization's visitor policies.

In one or more embodiments, notifications may also be associated with the above-described visitor tracking features. These may include: 1) visitor is dwelling in a location he/she was not prescribed to be dwelling based on the agenda; 2) visitor is in a location in the building where visitors are not allowed; and 3) visitor is unescorted. In various embodiments, these notifications may be routed to hosts, organizational administrators, and/or security personnel.

In yet another embodiment, the described system 100 may additionally support a fourth, "administrator role." The administrator would be a secretary or a visitor coordinator responsible for handling administrative tasks within the organization. In one or more embodiments, the system 100 would provide this person with all the notifications going to the host person, and enable such person to perform all actions on behalf of the host person. However, this person does not show up on the visit and gathering user interface screens, as shown, for example, in FIGS. 2(a)-2(d) (as they are not really participating in the events associated with the visit).

Computing Platforms

Figure 5:
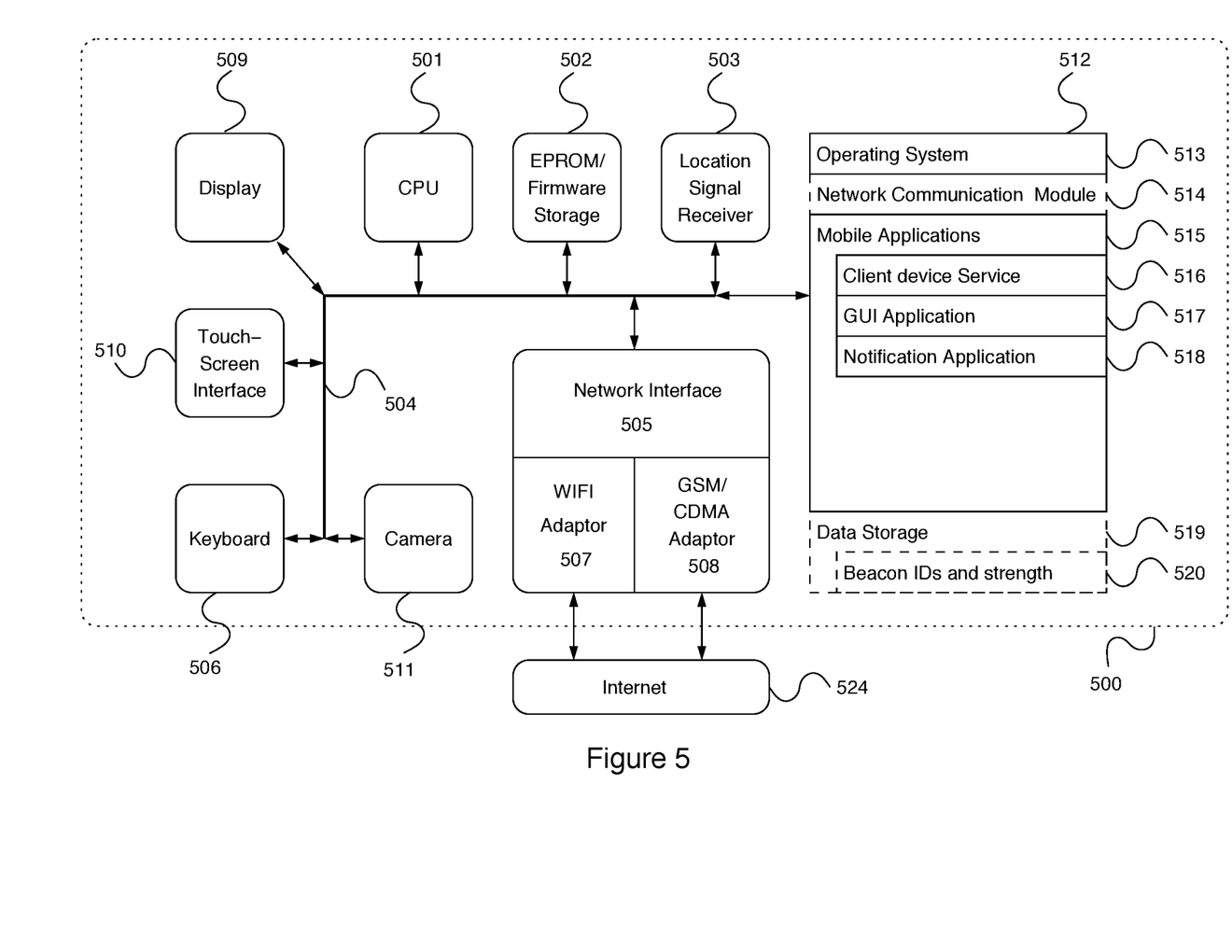
FIG. 5 illustrates an exemplary embodiment of a computerized mobile system that could be used as the mobile client device in connection with the system for automatic awareness and management of corporate visitor scheduling and coordination shown in FIG. 1.

FIG. 5 illustrates an exemplary embodiment of a computerized mobile system 500 that could be used as the mobile client device 101 in connection with the system 100 illustrated in FIG. 1. In one or more embodiments, the computerized mobile system 500 may be implemented within a form factor of a mobile computing device, such as a smartphone, a personal digital assistant (PDA), a tablet computer, or a smart watch, all of which are widely available commercially and are well known to persons of skill in the art.

The computerized system 500 may include a data bus 504 or other interconnect or communication mechanism for communicating information across and among various hardware components of the mobile computerized system 500, and a central processing unit (CPU or simply processor) 501 coupled with the data bus 504 for processing information and performing other computational and control tasks. Computerized system 500 also includes a memory 512, such as a random access memory (RAM) or other dynamic storage device, coupled to the data bus 504 for storing various information as well as instructions to be executed by the processor 501. The memory 512 may also include persistent storage devices, such as a magnetic disk, optical disk, solid-state flash memory device or other non-volatile solid-state storage devices.

In one or more embodiments, the memory 512 may also be used for storing temporary variables or other intermediate information during execution of instructions by the processor 501. Optionally, computerized system 500 may further include a read only memory (ROM or EPROM) 502 or other static storage device coupled to the data bus 504 for storing static information and instructions for the processor 501, such as firmware necessary for the operation of the computerized system 500, basic input-output system (BIOS), as well as various configuration parameters of the computerized system 500.

In one or more embodiments, the computerized system 500 may incorporate a display device 509, which may be also coupled to the data bus 504, for displaying various information to a user of the computerized system 500. In an alternative embodiment, the display device 509 may be associated with a graphics controller and/or graphics processor (not shown). The display device 509 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 509 may be incorporated into the same general enclosure with the remaining components of the computerized system 500. In an alternative embodiment, the display device 509 may be positioned outside of such enclosure.

In one or more embodiments, the computerized system 500 may incorporate one or more input devices, such as a touchscreen interface 910 for receiving tactile commands, a camera 511 for acquiring still images and video of various objects, such as user's faces or room surroundings, as well as a keyboard 506, which all may be coupled to the aforesaid data bus 504 for communicating information, including, without limitation, images and video, as well as user command selections to the processor 501. In an alternative embodiment, input devices may include a system for tracking eye movements of the user (not shown), which may be used to indicate to the computerized system 500 the command selection by the user.

In one or more embodiments, the computerized system 500 may additionally include a location signal receiver 503 configured to perform scan for beacons 101 and supply scan data described above to the processor 501 via the data bus 504.

In one or more embodiments, the computerized system 500 may additionally include a communication interface, such as a network interface 505 coupled to the data bus 504. The network interface 505 may be configured to establish a connection between the computerized system 500 and the Internet 524 using at least one of WIFI interface 507 and the cellular network (GSM or CDMA) adaptor 508. The network interface 505 may be configured to provide a two-way data communication between the computerized system 500 and the Internet 524. The WIFI interface 507 may operate in compliance with 802.11a, 802.11b, 802.11g and/or 802.11n protocols as well as Bluetooth protocol well known to persons of ordinary skill in the art. In an exemplary implementation, the WIFI interface 507 and the cellular network (GSM or CDMA) adaptor 508 send and receive electrical or electromagnetic signals that carry digital data streams representing various types of information. For example, the aforesaid networking components may be used to establish a network data connection between the computerized system 500 and other components of the system 100, such as the location services 102.

In one or more embodiments, the Internet 524 typically provides data communication through one or more sub-networks to other network resources. Thus, the computerized system 500 is capable of accessing a variety of network resources located anywhere on the Internet 524, such as web servers, other content servers as well as other network data storage resources. In one or more embodiments, the computerized system 500 is configured send and receive messages, media and other data, including application program code, through a variety of network(s) including Internet 524 by means of the network interface 505. In the Internet example, when the computerized system 500 acts as a network client, it may request code or data for an application program executing on the computerized system 500. Similarly, it may send various data or computer code to other network resources.

In one or more embodiments, the computerized system 500 uses the network interface 505 to send request(s), via the Internet 524, such as HTTP requests, to the location services 102 containing information described above.

In one or more embodiments, the functionality described herein is implemented by computerized system 500 in response to processor 501 executing one or more sequences of one or more instructions contained in the memory 512. Such instructions may be read into the memory 512 from another computer-readable medium. Execution of the sequences of instructions contained in the memory 512 causes the processor 501 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 501 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 501 for execution. For example, the instructions may initially be carried on a magnetic disk from a remote computer. Alternatively, a remote computer can load the instructions into its dynamic memory and send the instructions over the Internet 524. Specifically, the computer instructions may be downloaded into the memory 512 of the computerized system 500 from the foresaid remote computer via the Internet 524 using a variety of network data communication protocols well known in the art.

In one or more embodiments, the memory 512 of the computerized system 500 may store any of the following software programs, applications or modules:

1. Operating system (OS) 513, which may be a mobile operating system for implementing basic system services and managing various hardware components of the computerized system 500. Exemplary embodiments of the operating system 513 are well known to persons of skill in the art, and may include any now known or later developed mobile operating systems.

2. A network communication module 514 may incorporate, for example, one or more network protocol stacks which are used to establish a networking connection between the computerized server system 500 and the various network entities of the Internet 524, such as the location services 102, using the network interface 505 working in conjunction with the WIFI adaptor 507 or GSM/CDMA adaptor 508.

3. Mobile applications 515 may include, for example, a set of software applications executed by the processor 501 of the computerized system 500, which cause the computerized mobile system 500 to perform certain predetermined functions, such as receive the beacon signals as described above. In one or more embodiments, the mobile applications 515 may include, for example, the client device service 516 as well as graphical user interface generation application 517 as well as notification application 518.

4. Data storage 519 may be used, for example, for storing the bacon scan data 520.

Figure 6:
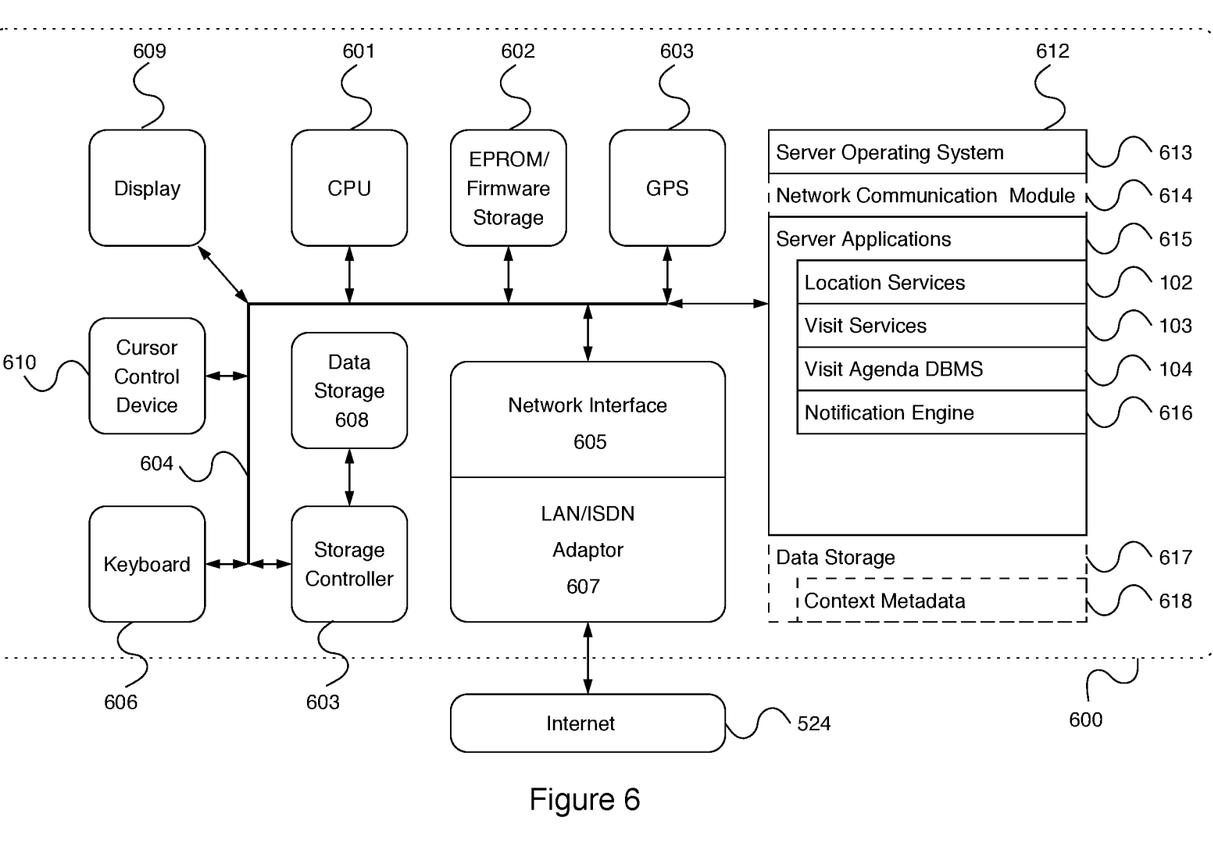
FIG. 6 illustrates an exemplary embodiment of a computerized server system, which could be used for deploying various services of the system for automatic awareness and management of corporate visitor scheduling and coordination shown in FIG. 1.

FIG. 6 illustrates an exemplary embodiment of a computerized server system 600, which could be used for deploying various services of the system for automatic awareness and management of corporate visitor scheduling and coordination shown in FIG. 1.

In one or more embodiments, the computerized server system 600 may incorporate a data bus 604, which may be substantially similar and may perform substantially similar functions as the data bus 604 of the computerized system 500 illustrated in FIG. 9. In various embodiments, the data bus 604 may use the same or different interconnect and/or communication protocol as the data bus 504. The one or more processors (CPUs) 601, the network adaptor 605, the EPROM/Firmware storage 602, the display device 609 and the keyboard 606 of the computerized server system 600 may be likewise substantially similar to the respective processor 501, the network interface 505, the EPROM/Firmware storage 502, the display device 509 and the keyboard 506 of the computerized system 500, except that the former components are deployed in a server platform configuration. In various implementations, the one or more processor 601 may have substantially increased processing power as compared with the processor 501.

In addition to the input device 606 (keyboard), the computerized server system 600 may additionally include a cursor control device 610, such as a mouse, a trackball, or cursor direction keys for communicating direction information and command selections to processor 601 and for controlling cursor movement on the display device 609. This input device typically has two degrees of freedom in two axes, a first axis (e.g., x) and a second axis (e.g., y), that allows the device to specify positions in a plane.

The LAN/ISDN adaptor 607 of the computerized server system 600 may be implemented, for example, using an integrated services digital network (ISDN) card or a modem to provide a data communication connection to a corresponding type of telephone line, which is interfaced with the Internet 524 using Internet service provider's hardware (not shown). As another example, the LAN/ISDN adaptor 607 may be a local area network interface card (LAN NIC) to provide a data communication connection to a compatible LAN and the Internet 524. To store various media files, the computerized server system 600 may be provided with data storage 608, for storing various data by means of a storage controller 603. The camera 611 may be used to acquire images and/or video of various objects.

In one or more embodiments, the memory 612 of the computerized server system 600 may store any of the following software programs, applications, modules and/or data:

1. A server operating system (OS) 613, which may be an operating system for implementing basic system services and managing various hardware components of the computerized server system 600. Exemplary embodiments of the server operating system 613 are all well known to persons of skill in the art, and may include any now known or later developed operating systems.

2. A network communication module 614 may incorporate, for example, one or more network protocol stacks which are used to establish a networking connection between the computerized server system 600 and the various network entities of the Internet 524, such as the computerized mobile system 500, using the network adaptor 605 working in conjunction with the LAN/ISDN adaptor 607.

3. Server applications 615 may include, for example, a set of software applications executed by one or more processors 601 of the computerized server system 600, which cause the computerized server system 600 to perform certain predetermined functions or tasks. In one or more embodiments, the server applications 615 may include the location services 102, the visit services 103, the visit agenda database 104 as well as notification engine 616.

4. Data storage 617 may be used, for example, for storing the context metadata 618, which may be stored in a form of database tables.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in systems and methods for automatic awareness and management of corporate visitor scheduling and coordination. It is intended that the specification and examples be considered as exemplary only, with a true scope and spirit of the invention being indicated by the following claims.

What is claimed is:

1. A computer-implemented method, the method being performed in a computerized system comprising a central processing unit, a localization electromagnetic signal receiver and a memory, the computer-implemented method comprising:
   a. tracking real-time locations of a plurality of user devices associated with a plurality of users by receiving localization electromagnetic signals from electromagnetic signal sources using the localization electromagnetic signal receiver as the plurality of user devices travel relative to the electromagnetic signal sources;
   b. determining at least a current, real-time location of each of the plurality of user devices based on a strength of currently received electromagnetic localization signals;
   c. storing information on a role of the each of the plurality of users associated with the plurality of user devices in connection with a visit;
   d. storing information on an agenda of the visit, the agenda information comprising a scheduled time and a location of at least one event associated with the visit; and
   e. using the determined current, real-time location of the plurality of user devices, the stored role information and the stored visit agenda information to manage the visit prior to the schedule time, wherein managing the visit prior to the scheduled time comprises:
      determining a relative, real-time location of each of the plurality of user devices based on the current, real-time location of the plurality of user devices in relation to the location of the at least one event,
      generating, on a display of at least a first user device of the plurality of user devices, a graphical user interface comprising a plurality of visual indicators, each graphically representative of a user of the plurality of users, and a plurality of graphical widgets each proximate to and each associated with a visual indicator of the plurality of visual indicators, each graphical widget comprising visual attributes that are configured to be displayed responsive to the determined relative, real-time location of the respective user device of each respective user that corresponds to each respective visual indicator,
      in response to determining the relative, real-time location of at least a second user device, determining whether an estimated time of arrival for a second user associated with the second user device at the location of the at least one event is later than the scheduled time of the at least one event, the estimated time of arrival for the second user is based on the relative, real-time location, and
      in response to determining that the estimated time of arrival for the second user is later than the scheduled time, adjusting the scheduled time of the at least one event and generating, on a display of the at least the first user device, the adjusted scheduled time of the at least on event.

2. The computer-implemented method of claim 1, wherein the visit agenda information comprises information on a plurality of events associated with the visit, the plurality of events comprising the at least one event.

3. The computer-implemented method of claim 2, wherein the stored information on an agenda of the visit comprises a location of each event.

4. The computer-implemented method of claim 3, wherein when the localization electromagnetic signals are not received for one of the users, the respective graphical widget indicates that the location of the user cannot be determined.

5. The computer-implemented method of claim 3, wherein the location indicator is selected from a group comprising: "in the building," "near the building," "far from the building".

6. The computer-implemented method of claim 3, wherein the location indicator is selected from a group comprising: "in the building," "near the building," "far from the building" and "in the location of the event".

7. The computer-implemented method of claim 3, wherein each of the graphical widgets comprises a colored graphical widget and wherein the color of the colored graphical widget is responsive of the relative, real-time location of the respective user, wherein a first color is indicative of a first relative, real-time location and second color is indicative of a second relative, real-time location that is farther from the location of the at least one event than the first relative, real-time location.

8. The computer-implemented method of claim 7, wherein the colored graphical widget is a colored halo that surrounds an image of the user.

9. The computer-implemented method of claim 3, wherein the graphical widgets comprise a measure of a distance between the current, real-time location of the first user device and the location of the at least on event.

10. The computer-implemented method of claim 9, wherein the measure of the distance is indicated in distance units.

11. The computer-implemented method of claim 9, wherein the measure of the distance is indicated in time units indicative when the user would arrive to the location of the at least one event.

12. The computer-implemented method of claim 2, wherein the visit agenda information comprises a time of each event and wherein managing the visit comprises generating a graphical user interface comprising an indicator indicating whether the user is delayed for the at least one event.

13. The computer-implemented method of claim 12, wherein the indicator comprises a measure of time of the delay of the user for the visit.

14. The computer-implemented method of claim 2, wherein information on each event associated with the visit comprises a time and a location of each event associated with the visit and wherein the computer-implemented method further comprises automatically adjusting the time of each event associated with the visit based on location of the plurality of users in relation to the location of the at least one event.

15. The computer-implemented method of claim 14, further comprising providing the adjusted time of each event associated with the visit to each user associated with the event.

16. The computer-implemented method of claim 1, wherein the visit agenda information comprises information on each user participating in each event associated with the visit.

17. The computer-implemented method of claim 16, wherein the information on each user participating in the visit comprises user's mobile device identifier (ID).

18. The computer-implemented method of claim 1, wherein the role of each of the plurality of users in connection with the visit is selected from a group comprising a visitor user, a host user and a non-host participant user and wherein each visit is associated with at least one visitor user and at least one host user.

19. The computer-implemented method of claim 18, further comprising notifying the host user of an arrival of the visitor user in a location associated with the visit.

20. The computer-implemented method of claim 18, further comprising notifying the host user of an attention request from the visitor user.

21. The computer-implemented method of claim 18, further comprising notifying the host user of a delay in arrival of the visitor user in a location associated with the visit.

22. The computer-implemented method of claim 1, wherein the role of the first user in connection with the visit is an administrative user and wherein the computer implemented method further comprises notifying the administrative user of an arrival of the visitor user in a location associated with the visit or of a delay in arrival of the visitor user in a location associated with the visit.

23. The computer-implemented method of claim 1, wherein the localization electromagnetic signal comprises one or more radiofrequency signals from one or more radiofrequency beacons.

24. The computer-implemented method of claim 1, further comprising scanning ambience for localization electromagnetic signals using the localization electromagnetic signal receiver, registering the signal strength of the received electromagnetic localization signals at the localization electromagnetic signal receiver, and determining the current, real-time location using the signal strength of the received the currently received electromagnetic localization signals, wherein the signal strength of the received electromagnetic localization signals corresponds to the current, real-time location of each of the plurality of user devices relative to the at least one electromagnetic signal source.

25. A non-transitory computer-readable medium embodying a set of computer-executable instructions, which, when executed in connection with a computerized system comprising a central processing unit, a localization electromagnetic signal receiver, a display and a memory, cause the computerized system to perform a method comprising:
  a. tracking real-time locations of a plurality of user devices associated with a plurality of users by receiving localization electromagnetic signals from electromagnetic signal sources using the localization electromagnetic signal receiver as the plurality of user devices travel relative to the electromagnetic signal sources;
  b. determining at least a current, real-time location of each of the plurality of user devices based on a strength of currently received electromagnetic localization signals;
  c. storing information on a role of the each of the plurality of users associated with the plurality of user devices in connection with a visit;
  d. storing information on an agenda of the visit, the agenda information comprising a scheduled time and a location of at least one event associated with the visit; and
  e. using the determined current, real-time location of the plurality of user devices, the stored role information and the stored visit agenda information to manage the visit prior to the schedule time, wherein managing the visit prior to the scheduled time comprises:
    determining a relative, real-time location of each of the plurality of user devices based on the current, real-time location of the plurality of user devices in relation to the location of the at least one event, generating, on a display of at least a first user device of the plurality of user devices, a graphical user interface comprising a plurality of visual indicators, each graphically representative of a user of the plurality of users, and a plurality of graphical widgets each proximate to and each associated with a visual indicator of the plurality of visual indicators, each graphical widget comprising visual attributes that are configured to be displayed responsive to the determined relative, real-time location of the respective user device of each respective user that corresponds to each respective visual indicator, in response to determining the relative, real-time location of at least a second user device, determining whether an estimated time of arrival for a second user associated with the second user device at the location of the at least one event is later than the scheduled time of the at least one event, the estimated time of arrival for the second user is based on the relative, real-time location, and in response to determining that the estimated time of arrival for the second user is later than the scheduled time, adjusting the scheduled time of the at least one event and generating, on a display of the at least the first user device, the adjusted scheduled time of the at least on event.

26. A computerized system comprising a central processing unit, a localization electromagnetic signal receiver and a memory, the memory storing a set of computer-readable instructions causing the computerized system to perform a method comprising:

a. tracking real-time locations of a plurality of user devices associated with a plurality of users by receiving localization electromagnetic signals from electromagnetic signal sources using the localization electromagnetic signal receiver as the plurality of user devices travel relative to the electromagnetic signal sources;

b. determining at least a current, real-time location of each of the plurality of user devices based on a strength of currently received electromagnetic localization signals;

c. storing information on a role of the each of the plurality of users associated with the plurality of user devices in connection with a visit;

d. storing information on an agenda of the visit, the agenda information comprising a scheduled time and a location of at least one event associated with the visit; and e. using the determined current, real-time location of the plurality of user devices, the stored role information and the stored visit agenda information to manage the visit prior to the schedule time, wherein managing the visit prior to the scheduled time comprises:

determining a relative, real-time location of each of the plurality of user devices based on the current, real-time location of the plurality of user devices in relation to the location of the at least one event, generating, on a display of at least a first user device of the plurality of user devices, a graphical user interface comprising a plurality of visual indicators, each graphically representative of a user of the plurality of users, and a plurality of graphical widgets each proximate to and each associated with a visual indicator of the plurality of visual indicators, each graphical widget comprising visual attributes that are configured to be displayed responsive to the determined relative, real-time location of the respective user device of each respective user that corresponds to each respective visual indicator, in response to determining the relative, real-time location of at least a second user device, determining whether an estimated time of arrival for a second user associated with the second user device at the location of the at least one event is later than the scheduled time of the at least one event, the estimated time of arrival for the second user is based on the relative, real-time location, and in response to determining that the estimated time of arrival for the second user is later than the scheduled time, adjusting the scheduled time of the at least one event and generating, on the display of the at least the first user device, the adjusted scheduled time of the at least on event.

* * * * *